United States Patent Office 3,283,036
Patented Nov. 1, 1966

3,283,036
NON-REFLECTIVE COATING COMPOSITION CONTAINING FINELY DIVIDED POLYPROPYLENE
Craig W. Larson, Grand Rapids, Mich., assignor to E. I. du Pont de Nemours and Company, Wilmington, Del., a corporation of Delaware
No Drawing. Continuation of application Ser. No. 257,744, Feb. 11, 1963. This application Feb. 16, 1965, Ser. No. 433,212
9 Claims. (Cl. 260—897)

This application is a continuation of application Serial No. 257,744, filed February 11, 1963.

This invention relates to coating compositions and is more particularly directed to coating compositions containing finely divided dispersed polypropylene as a flatting agent.

It has been found that incorporation of finely divided polypropylene into coating compositions reduces the surface reflectance of the coatings produced by such compositions. These flat or semi-gloss coatings are superior to those produced with conventional inorganic extenders such as silicas and talcs in that they retard the collection of dirt, resist scratching, marring, chalking and dulling on exposure, have excellent durability and give esthetically pleasing textured effects. All these advantages are achieved without sacrificing flexibility, adhesion or durability. The coatings also relieve roll-up mottling in the finishing of post-formable metal roll stock.

The polypropylene used can be any capable of being reduced to the requisite particle size. The size of the polypropylene particles and their size distribution in the compositions depends primarily on the compositions themselves and their use. For general applications, the particles should have mean diameters[1] of no greater than about 20 microns and the size distribution should be such that no particles have diameters in excess of about 75 microns.[2] For flatting effects in interior applications, for example in finishing furniture, the compositions will contain particles having a mean diameter of 7–10 microns. The lower size limit of the particles is governed by the degree of fineness to which the polypropylene can be reduced. For evenness and quality of finish it is desirable, in most applications, that the particle size distribution be as uniform as possible.

It is important, in the compositions of the invention, that the polypropylene retain its particulate size and shape. The coating compositions flatted with polypropylene can therefore be any whose ingredients do not interfere with this requirement. The compositions must be free of solvents which dissolve the polypropylene to any substantial degree under intended conditions of use and storage. Polypropylene can accordingly be used as a flatting agent in any organic coating composition whose ingredients do not dissolve or otherwise interfere, to any substantial degree, with its particle size and configuration. For example, it can be used in such compositions as acrylic lacquers, acrylic enamels, alkyd and melamine or urea-formaldehyde modified alkyd enamels, aqueous emulsion paints, nitrocellulose lacquers, vinyl lacquers, epoxy enamels, urethane enamels, and elastomeric paints.

The low surface light reflectance of coatings produced by these compositions makes them especially useful for coating automobile dashboards to reduce glare, in camouflage applications, and in applications where low surface reflectance and high abrasion resistance are desirable, for example in painting walls, coating kitchen cabinets and in finishing furniture. The compositions are also useful in coating automobile roofs to simulate convertible tops.

The amounts of polypropylene used will naturally vary according to the polypropylene particle size, the degree of flatting desired, the composition being modified, the substrate to be coated, and like factors. Generally, polypropylene will be added to the coating compositions at concentrations of from 0.5% to 90%, by weight, of the total solids present. In most applications, concentrations of from 5% to 65% will be used, and in preferred compositions the concentrations will be in the range of 10% to 50%.

The polypropylene can be reduced to the requisite particle size by ball milling; the proper size distribution is then obtained by screening. A highly preferred method, however, is to reduce the particle size by passing it through a high impact mill more particularly described in U.S. Patent 3,146,958. This reduction will give the proper particle size distribution after classification.

In such a mill, the polypropylene is fractured into fragments by throwing it, at high centrifugal energy levels, past rapidly rotating discs having peripherally disposed teeth of a special design, against circumferential anvil surfaces or interdigitating stationary or counterrotating teeth which act as anvil surfaces.

The resulting polypropylene fluff is then dispersed, in the proper amount, into the desired coating composition which has been or is being prepared by grinding the pigments in the vehicle according to customary procedures. The mixture is stirred or otherwise agitated to provide a uniform dispersion and is then ready for use. In some cases, it may be necessary to add a surfactant to insure proper wetting of the particles.

These coating compositions can be applied by such usual techniques as brushing, spraying or roller coating, and require no special equipment.

Similar flatting effects can be obtained by incorporating into coating compositions other polymeric materials which are capable of being reduced to the requisite particle size. Such polymeric materials are, for example, polytetrafluoroethylene, polyvinylfluoride, polyvinyl chloride, polyoxymethylene and polyacrylonitrile.

The following examples are presented so that the invention may be more readily practiced and more easily understood. Each composition is prepared by customary milling and mixing techniques; the polypropylene is then added and the composition stirred to give a uniform dispersion.

EXAMPLE 1

Interior flat automotive thermosetting acrylic enamel

| | Percent |
|---|---|
| Molybdate Orange | 9.30 |
| Maroon pigment | 3.37 |
| Santocel C (a light weight, porous silica aerogel) | 1.50 |
| Thermosetting methacrylic polymer (Rohm & Haas Acryloid AT 50, a styrene, methyl methacrylate, lauryl methacrylate, hydroxy ethyl methacrylate, methacrylic acid, 30/30/26/12/2 interpolymer with a Gardner-Holt viscosity Z at 55% solids in 5:1 xylene-butanol) | 20.19 |
| 43% Soya oil modified alkyd resin | 2.54 |

---
[1] Determined with a Fisher Sub-Sieve Sizer, an instrument sold by the Fisher Scientific Co., and described in its Catalog No. 14–311.
[2] Determined by microscopic measurements.

EXAMPLE 1—Continued

| | Percent |
|---|---|
| Butylated urea-formaldehyde resin | 1.25 |
| Butylated melamine-formaldehyde resin | 4.31 |
| Xylol | 7.37 |
| High boiling aromatic solvent (Solvesso 100) | 23.32 |
| Methanol | 1.50 |
| Cellosolve acetate | 2.83 |
| Butyl alcohol | 6.31 |
| High boiling aromatic solvent (Solvesso 150) | 5.45 |
| Polypropylene powder (18 micron mean diameter) | 10.76 |

This enamel is reduced to spray viscosity and sprayed to metal which has been finished with appropriate undercoats or given adequate treatment to provide proper adhesion. The resulting 0.8 to 2 mil thick film is then baked for 30 minutes at 270° F.

The resulting finish is characterized by extremely low surface reflectance. The finish is tough, mar resistant, stain resistant and flexible.

EXAMPLE 2

Interior flat automotive acrylic lacquer

| | Percent |
|---|---|
| Carbon black | 2.11 |
| Cationic surface treated clay (Bentone 34") | 0.75 |
| Polymethyl methacrylate (U.S. 2,934,509) relative viscosity 1.165 | 22.22 |
| Butyl benzyl phthalate | 7.67 |
| Silicone solution (2%) flow control agent | 0.24 |
| Acetone | 12.03 |
| Xylol | 21.72 |
| Toluene | 23.33 |
| Cellosolve acetate | 2.76 |
| Polypropylene powder (18 micron mean diameter) | 7.17 |

This lacquer is reduced to spray viscosity with appropriate lacquer thinner and is then sprayed to a properly prepared metal automotive dashboard to give a film thickness of about 0.8 to 2 mils.

This coating can then either be air dried or baked for 10 minutes at 300° F. to give a suede-like finish which has low surface reflectance and is tough and mar resistant.

EXAMPLE 3

Interior flat nitrocellulose lacquer

| | Percent |
|---|---|
| Phthalocyanine blue | 0.07 |
| Titanium dioxide | 0.09 |
| Ferrite yellow | 0.02 |
| Aluminum flake | 1.56 |
| Carbon black | 1.09 |
| Diatomaceous earth | 1.44 |
| Coconut oil alkyd resin (53% oil) | 5.20 |
| Nitrocellulose (26 seconds) | 12.94 |
| Castor oil | 2.39 |
| Dibutyl phthalate | 3.61 |
| Isopropyl alcohol | 7.94 |
| Toluene | 6.98 |
| Acetone | 15.00 |
| Methyl isobutyl ketone | 10.81 |
| Methyl amyl acetate | 15.44 |
| Naphtha | 7.42 |
| Polypropylene powder (18 micron mean diameter) | 8.00 |

This composition is applied as described for the lacquer in Example 2, and is baked for the same period at 200° F. with substantially the same results.

EXAMPLE 4

Low gloss alkyd resin strip coating enamel

| | Percent |
|---|---|
| Titanium dioxide | 25.35 |
| Santocel C (a light weight, porous silica aerogel) | 2.28 |
| Short soya oil alkyd resin | 20.08 |
| Butylated melamine-formaledhyde resin | 1.96 |
| Butylated urea-formaldehyde resin | 6.25 |
| Butanol | 6.99 |
| High boiling aromatic solvent (Solvesso 100) | 28.00 |
| Polypropylene powder (15 micron mean diameter) | 9.09 |

This composition is continuously applied with a roll coater to chromatized aluminum stripping to give a coating 1 mil thick. The stripping is then continuously baked so that it is subjected to a temperature of 450° F. for about 72 seconds.

This gives aluminum strip coating which is tough, mar resistant and has low gloss. There is no evidence of roll-up mottling in the coiled stripping.

EXAMPLE 5

Flat aqueous emulsion interior finish

| | Percent |
|---|---|
| Magnesium silicate | 2.29 |
| Titanium dioxide | 3.79 |
| Finely ground classified vermiculite | 10.79 |
| Ferrite yellow | 0.43 |
| Carbon black | 0.73 |
| Red iron oxide | 0.30 |
| Acrylic emulsion vehicle (Rohm & Haas Rhoplex AC-34, a methyl methacrylate ethyl acrylate 33/67 copolymer, emulsion polymerized) | 18.53 |
| Methyl cellulose 4000 cps. (Dow Methacel HG) | 4.33 |
| Ethylene glycol | 0.45 |
| Propylene glycol | 0.09 |
| Sodium polycarboxylate (Rohm & Haas Tanol 731) | 0.29 |
| Phenyl mercury oleate | 0.04 |
| Polyacrylic acid (Rohm & Haas Acrysol A-B) | 0.05 |
| Water | 49.12 |
| Polypropylene powder (7 micron mean diameter) | 8.50 |

This composition can be applied by brush or by further reducing it with water and then spraying it to properly prepared substrates such as plaster, wood, metal or plastic to give film thicknesses of approximately 0.8 to 2 mils. The coatings are low in surface reflectance, have a suede-like feel and show good mar resistance. They can be either air dried or baked up to temperatures of 300° F. for 20 minutes.

EXAMPLE 6

Vinyl top coat lacquer

| | Percent |
|---|---|
| Pigments (pthalocyanine blue, pthalocyanine green, TiO$_2$, 1:1:1) | 3.50 |
| Aluminum flake pigment | .20 |
| Polymethyl methacrylate (U.S. 2,934,509) relative viscosity 1.165 | 9.52 |
| Vinyl chloride-vinyl acetate 87/13 copolymer | 9.52 |
| Plasticizer (Rohm & Haas Paraplex G-54) | 10.07 |
| Cellosolve acetate | 5.00 |
| Acetone | 25.00 |
| Toluene | 10.00 |
| Methyl isobutyl ketone | 15.00 |
| Xylene | 2.39 |
| Diisobutyl ketone | 1.00 |
| Polypropylene powder (15 micron mean diameter) | 8.80 |

This composition is reduced 100% by volume with a 50% toluol, 50% methyl isobutyl ketone lacquer thinner solution, is sprayed on an unsupported polyvinyl chloride film to a thickness of 1-2 mils, and then air dried or baked at 200° F. for 30 minutes to give a low gloss, durable, mar resistant finish.

EXAMPLE 7

*Exterior low gloss automotive acrylic lacquer*

|  | Percent |
|---|---|
| Titanium dioxide | 10.85 |
| Ferrite yellow | 0.29 |
| Carbon black | 0.05 |
| Red iron oxide | trace |
| Phthalocyanine green | trace |
| Polymethyl methacrylate (U.S. 2,934,509) relative viscosity 1.165 | 14.84 |
| Butyl benzyl phthalate | 7.69 |
| Silicone solution (2%) flow control agent | 0.24 |
| Cellosolve acetate | 10.51 |
| Cellulose acetate butyrate | 5.64 |
| Toluene | 31.36 |
| Acetone | 13.99 |
| Xylol | 0.54 |
| Polypropylene powder (17 micron mean diameter) | 4.00 |

This composition is applied as described for the lacquer of Example 2, except that it is applied over the exterior of suitably prepared or primed metal to give a low surface reflectant finish with good durability, good resistance to marring and staining, and a high level of water repellency. The finish can be cleaned with highly abrasive cleaning compounds without destroying its low surface reflectance characteristics.

The composition is particularly suited for finishing the roofs of hard-top model automobiles to simulate the appearance of convertible fabric tops.

The foregoing examples show application of the compositions to properly prepared metal surfaces, but it should be understood that they can be applied to plastic surfaces as well, with substantially the same results.

The embodiments of the invention in which an exclusive property or privilege is claimed are:

1. A coating composition comprising an organic film-forming material and from 0.5% through 90%, by weight of the total solids present, of particulate polypropylene having a mean particle diameter of no greater than about 20 microns and a particle size distribution such that there are substantially no particles with diameters in excess of about 75 microns.

2. A coating composition comprising an organic film-forming material, pigment, and from 0.5% through 90%, by weight of the total solids present, of particulate polypropylene having a mean particle diameter of no greater than about 20 microns and a particle size distribution such that there are substantially no particles with diameters in excess of about 75 microns.

3. A coating composition according to claim 1 wherein the film-forming material is an acrylic ester polymer.

4. A coating composition according to claim 2 wherein the film-forming material is an acrylic ester polymer.

5. An article coated with a composition according to claim 1.

6. An article coated with a composition according to claim 2.

7. A method for reducing the surface light reflectance of an article, said method comprising the application to said article of a coating composition according to claim 1.

8. An article coated with a composition according to claim 3.

9. An article coated with a composition according to claim 4.

References Cited by the Examiner

UNITED STATES PATENTS 3,044,899   7/1962   Canterino _____ 260—897

MURRAY TILLMAN, *Primary Examiner.*

E. B. WOODRUFF, *Assistant Examiner.*